3,369,485
THIN-WALLED, GUN-LAUNCHED VEHICLES
John W. Jones, Redlands, Calif., assignor to Lockheed Aircraft Corporation, Burbank, Calif.
Filed Apr. 12, 1965, Ser. No. 447,429
14 Claims. (Cl. 102—49.3)

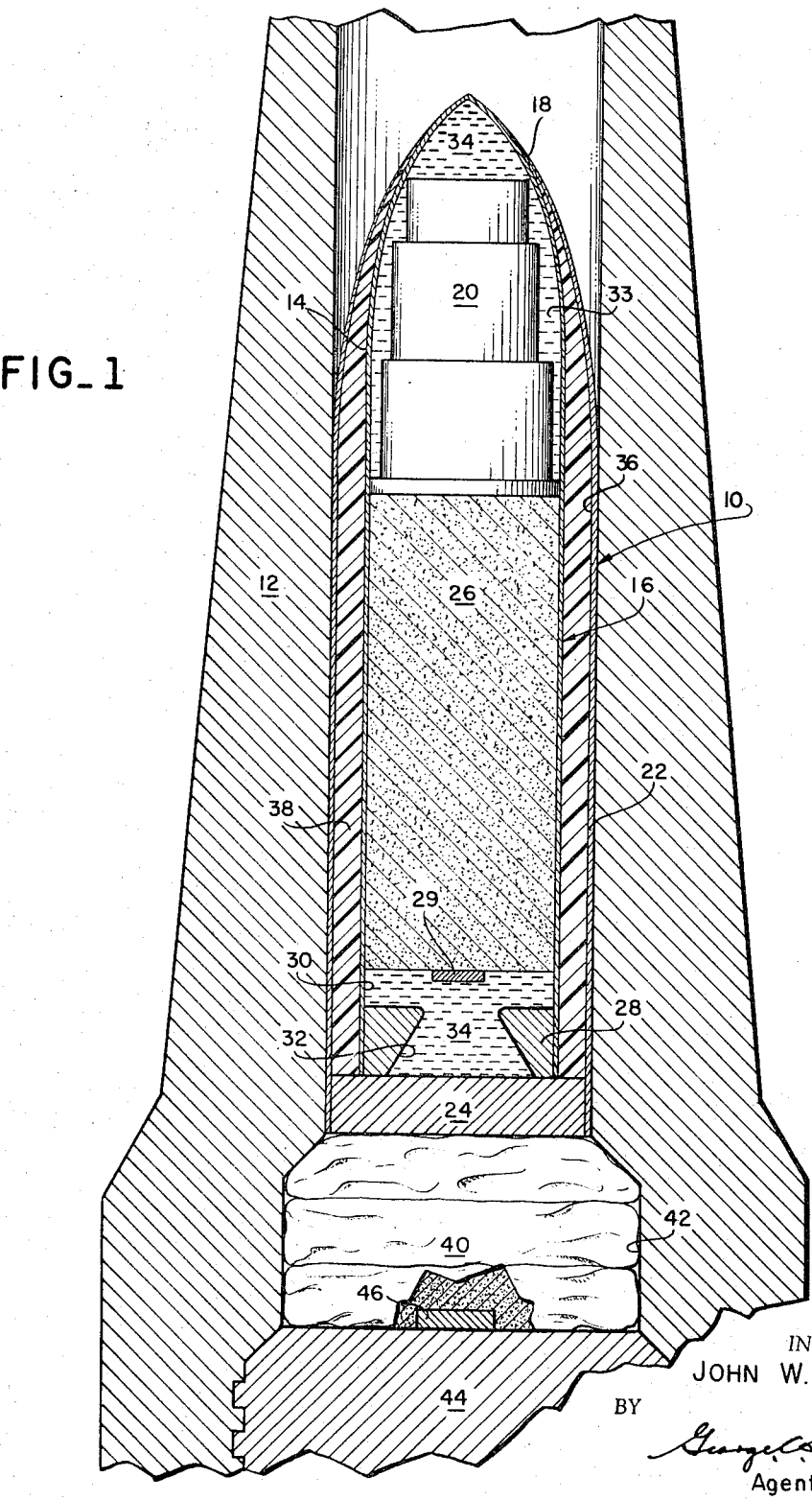
FIG_1

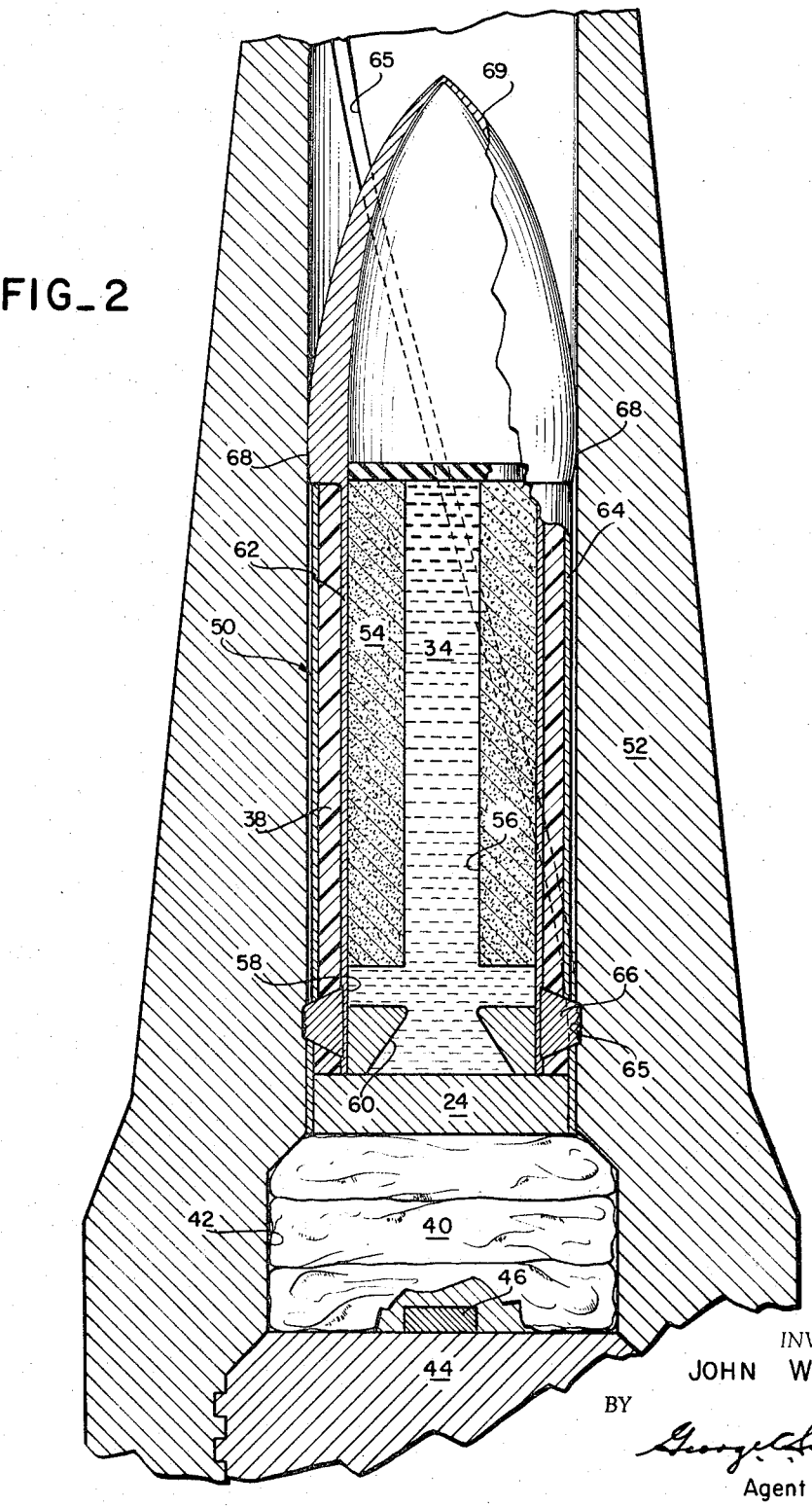

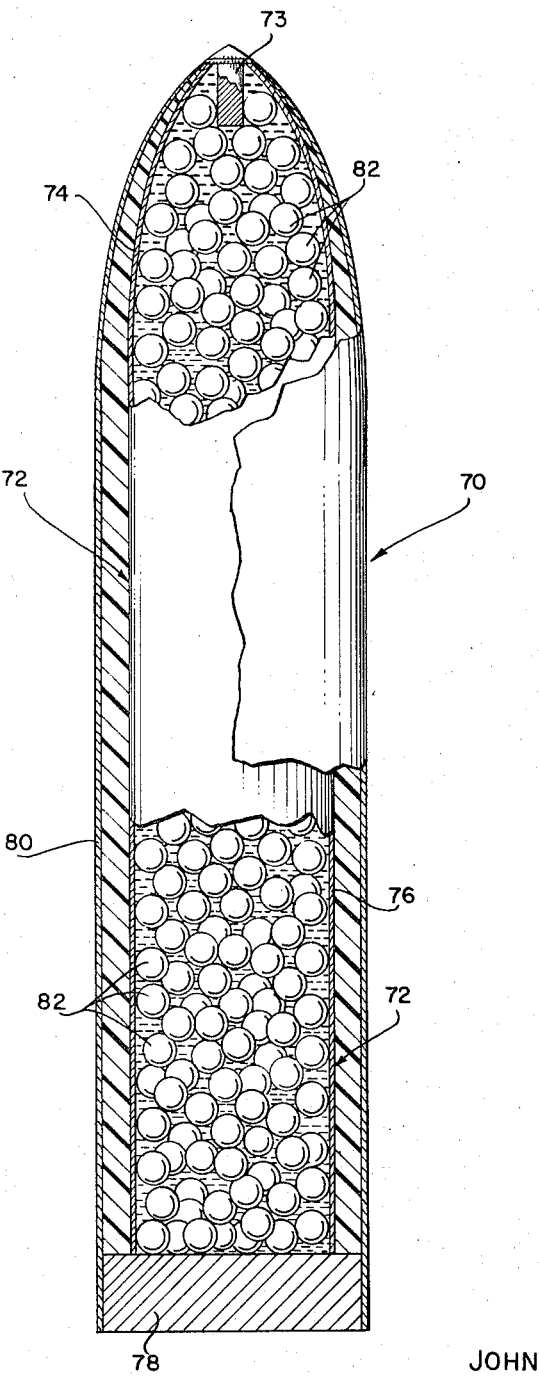

This invention relates to vehicles which are launched out of guns, and more particularly to such vehicles having relatively thin walls. These vehicles include those which are rocket-propelled after launch and those which have no rocket propulsion, the latter being referred to hereinafter as projectiles.

In recent years, the use of conventional guns, such as the 6-inch and 16-inch navy guns and the 105-millimeter and 155-millimeter army guns for launching rocket-assisted vehicles into the upper atmosphere for scientific probes has gained increasing interest primarily because of its potential for greatly reducing costs when compared with conventional rocket launching means. The savings result from using ordinary gun powder as the initial accelerating means for the vehicle rather than the booster or first stage of a conventional rocket. Also, the use of the above-mentioned guns for firing rocket-assisted vehicles and projectiles in military tactical situations has drawn interest primarily because of its potential for increasing the range of these vehicles.

However, the gun launch environment imposes severe physical conditions on the vehicle during its travel through the gun tube. For example, the acceleration loads imposed on a vehicle launched from 16-inch, 6-inch, or 155-millimeter guns may amount to between 3,000 to 20,000 gravities of acceleration. Also, the chamber pressures are considerable, ranging up to about 50,000 pounds per square inch for the 16-inch gun. Thus, the vehicle must be designed to withstand the severe structural loads caused by the acceleration and pressure. This has generally resulted in the use of extra heavy wall construction for the vehicle. While these heavy-walled vehicles have been used for sounding probes and for rocket-assisted artillery purposes, they are limited in their usefulness because of the excessive weight of the inert parts. Ideally, a high performance rocket-assisted vehicle should have the case walls and other inert parts just sufficiently strong enough to withstand the loads encountered during rocket operation, which are considerably less than those found in the gun tube.

Accordingly, it is an object of the present invention to provide a gun-launched vehicle which has a thin-wall and light weight construction but at the same time is capable of withstanding the gun launch conditions.

Generally stated, the present invention provides for a vehicle having a thin-walled casing with a cylindrical body and a converging nose portion and a sheath or cartridge shell around the casing body. The sheath contains, or is by itself, a rheological medium which acts substantially like a fluid under high acceleration loads. In one embodiment of the invention, the casing carries a payload in the nose and a solid propellant rocket motor in the casing body. The voids or cavities in the payload and motor are filled with a force balancing material, preferably a liquid. Upon launch, the fluid and the rheological medium provide a balancing of the launch forces across the vehicle walls so that the walls need not be of heavy construction. After launch, the sheath is generally detached by spin or aerodynamic forces, leaving the casing body exposed during the greater portion of the flight. The casing base is also detachable after launch to permit discharge of the fluid prior to ignition of the rocket motor.

In another embodiment of the present invention, the entire casing is filled with bomblets and the voids between the bomblets are filled with a rheological medium. Upon launch, the forces are balanced by the rheological medium on both sides of the casing.

Other features and advantages of the present invention can be further described in connection with the accompanying drawings wherein:

FIGURE 1 is a schematic diagram in section showing an embodiment of the present vehicle disposed in a gun tube for launching;

FIGURE 2 is a schematic diagram in section showing another embodiment of the present vehicle; and FIGURE 3 is a schematic diagram in section of still another embodiment of the present vehicle, showing an artillery projectile.

FIGURE 1 shows the present vehicle 10 disposed in a gun tube 12 preparatory to launch. Vehicle 10 has a metallic casing 14 comprised of a cylindrical body 16 and a converging nose portion 18 carrying a payload consisting of a pack 20 of scientific instruments. A plastic or elastomeric sheath, or cartridge shell 22, concentrically surrounds the body 16 and the nose portion 18 and is attached to the casing, as by adhesive bonding. Vehicle 10 also has a detachable base, or closure, 24 which may be of metal or plastic.

Contained within the casing is an end-burning solid propellant grain 26, a discharge nozzle assembly 28, and a rocket grain igniter and squibs 29, which together comprise a rocket motor for accelerating the vehicle still further after initial launch from the gun tube. Grain 26 and nozzle assembly 28 are separated by a cavity 30 circumscribed by the casing 16. Cavity 30, nozzle opening 32, and voids 33 in pack 20 are filled with a force balancing material 34, which preferably is a liquid fluid, but any other material which can be pumped or ejected out of the rocket motor, such as a gel, may also be used. These materials should be substantially non-compressible and they should also be chemically compatible with the grain. In general, these materials should have a density approximating the density of the grain or of the total vehicle excluding the material. Such density may range from about 0.04 pound per cubic inch to about 0.14 pound per cubic inch depending upon the vehicle design requirements. Some examples of fluids which may be used are organic compounds such as ethylene dibromide; water, and aqueous solutions of inorganic salts.

Cavity 36 between the casing 14 and the sheath 22 is filled with a rheological medium 38, said medium being described generally as one behaving substantially like a fluid when confined as shown and subjected to forces high enough to cause them to yield. Thus, medium 38 may be a fluid, a gel, a plastic, an elastomer, or a foamed material with a fluid contained in the cells. Such a medium generally should have the density, compressibility, strength, and chemical compatibility properties required to perform the desired force balancing across the casing.

Examples of suitable rheological media are such plastics as polyethylene and polytetrafluoroethylene and such elastomers as polyurethane and polybutadiene acrylic acid rubbers. An example of a suitable gel is a gelatin and water mixture. Examples of fluid-filled foam materials are foamed polyurethane or polybutadiene acrylic acid rubbers containing such liquids as ethylene dibromide, water or aqueous solutions of inorganic salts.

The physical properties of the rheological medium, such as yield strength, hardness, elongation, rupture strength, andl the like, may be adjusted by methods well-known in the art, and consequently are not further described in detail.

In some cases, the casing may be surrounded with a sheath of a single rheological material instead of the composite construction previously described. This single material should, of course, have the properties previously described for the materials forming the composite construction. An example of such material is polyethylene.

As previously described, the present vehicles are generally used in connection with large caliber guns, such as the 16-inch navy gun and the 155-millimeter army gun, although the present vehicles may also be used in guns as small as the .50 caliber machine gun. The structural features of these guns are well known in the art, and consequently are not further described in detail. In some cases, these guns may be modified by increasing or decreasing the barrel length. Also, as shown in FIGURE 1, the riflings in these guns may be removed to adapt them better as launching guns. It will be understood by those skilled in the art that these vehicles which are launched out of smooth bore guns must be provided with aerodynamic stabilizing means, such as fins and control jets (not shown).

Preparatory to launching the present vehicle, a gun propellant charge 40 is provided in the chamber 42 between the base 24 and the breech block 44. Charge 40 is selected to provide optimum nozzle velocity within the maximum operating pressure of the gun. Ideally, the charge should burn at a rate commensurate with the travel of the vehicle through the gun tube and maintain optimum operating pressure throughout the travel. This objective may be accomplished by the use of multi-perforated gun powder grains which burn with increasing or decreasing area as the web burns. Charge 40 is ignited in known manner with a suitable igniter 46.

The gases produced by the charge 40 exert pressure on the aft end of the base 24, launching vehicle 10 out of the tube. During launch, a compressive force is set up in grain 26, which varies from a maximum value at the aft end of the grain to a minimum value at the forward end of the grain. A similar force is set up in pack 20. Normally, these forces are great enough to rupture the thin case walls of the vehicle shown. However, in accordance with the present invention, these forces are counteracted by the hydrostatic pressure of fluid 34 and by the pressure of medium 38, and the pressure differential across the case wall is thereby minimized. This pressure balancing will be effective independently of the variation in gun breech pressures and vehicle acceleration during travel down the gun tube.

After launch from the tube, base 24 is detached in known manner, allowing fluid 34 to discharge from the vehicle prior to ignition of the motor. To facilitate discharge of the fluid, a plurality of nozzles may be provided instead of the single nozzle shown. Sheath 22 and the medium 38 are also detached by aerodynamic forces after launch, leaving the casing wall exposed during the greater portion of the flight for minimum aerodynamic drag.

Although vehicle 10 is shown in connection with a smooth bore gun tube, it may also be adapted for use with a rifled tube by designing sheath 22 with sufficient mechanical strength so that the exterior of the sheath will engage the lands of the tube and at the same time deform sufficiently to fill the grooves between the lands upon launch.

FIGURE 2 shows another embodiment in accordance with the present invention. Vehicle 50 shown disposed in gun tube 12 preparatory to launch is similar in construction with vehicle 10 with some differences to be hereinafter described. Vehicle 50 carries an internal burning solid propellant grain 54 having a central port 56 which is also filled with fluid 34, as well as the cavity 58 and nozzle opening 60, for the purpose of balancing the launch forces across the casing 62. Vehicle 50 also has a sheath 64 surrounding the case 62, said sheath 64 containing a rheological medium 38 also serving to balance the launch forces, as previously described in connection with vehicle 10.

Vehicle 50 is further adapted to be used in a gun tube 52 which has rifling 65 therein. A rotating band 66 and a bourrelet 68 are used to guide and rotate the vehicle in the gun tube on launch. Sheath 64, therefore, does not have to have any appreciable mechanical strength. In this embodiment, reinforced nose portion 69 may carry a payload or a warhead device (not shown) which is designed to withstand the launch forces.

FIGURE 3 shows an artillery projectile 70 in accordance with the present invention. Projectile 70 has a casing 72 with a converging nose portion 74 and a cylindrical body portion 76, a base 78, and a plastic or elastomeric sheath 80 concentrically surrounding the nose and the body portions. The sheath is attached to the casing as by bonding. Upon launch, the sheath is detached by spin or aerodynamic forces, leaving the casing body exposed during the greater portion of the flight.

Casing 72 is filled with bomblets 82 which may have spherical or cylindrical metallic casings. These bomblets generally contain fuzed explosives having highly destructive characteristics upon dispersal from the vehicle as by action of fuse 73. The voids between the bomblets and the cavity between the casing 72 and sheath 80 are filled with a rheological medium 38, as previously described. It is to be understood that any of the previously described materials, plastic, elastomer, gel, etc. may be used in the sheath cavity and in the voids and that the sheath may be made of a single rheological material instead of the composite construction described.

As previously described, the forces on either side of the casing walls are balanced by the rheological medium 38, permitting the use of relatively thin casing walls. By decreasing the wall thickness, the casing cavity is increased and the overall weight of the projectile is decreased. A larger cavity means that a greater amount of payload can be carried by the projectile for a given overall size.

Although particular details of construction have been described in conjunction with the above embodiments, modifications and variations thereof will be apparent to those skilled in the art, and it is intended to cover in the appended claims all such modifications and variations as found within the true spirit and scope of this invention.

I claim:

1. A gun-launched vehicle comprising: a thin-walled vehicle casing with a cylindrical body and a converging nose portion; a payload in the nose portion; a sheath around said casing body, said sheath containing a medium which acts like a fluid in transmitting pressure under high acceleration; an end-burning solid propellant grain contained in said casing; a cavity in the casing below said grain; discharge nozzle means disposed below said cavity; a fluid in said cavity and in the nozzle opening, said medium and fluid serving to minimize load differentials across the casing walls during launch of the vehicle; and a casing base detachable upon launch to permit discharge of the fluid.

2. A gun-launched vehicle comprising: a thin-walled vehicle casing with a cylindrical body and a converging nose portion; a payload in the nose portion; a sheath around said casing body, said sheath containing a medium which acts like a fluid in transmitting pressure under high acceleration; an internal burning solid propellant grain contained in said casing body; a cavity in the casing below said grain; discharge nozzle means disposed below said cavity; a fluid in said cavity and in the nozzle opening; said medium and fluid serving to minimize load differentials across the casing walls during launch of the vehicle; and a casing base detachable upon launch to permit discharge of the fluid.

3. A vehicle for launching out of a gun having a rifled tube, said vehicle comprising: a thin-walled vehicle casing with a cylindrical body and a converging nose portion; a payload in the nose portion; a concentric sheath around said casing body, said sheath containing a medium which acts like a fluid in transmitting pressure under high acceleration; a rocket motor within said casing, the cavities of said motor being filled with a fluid; said medium and fluid serving to minimize load differentials across the casing walls during launch of the vehicle; means on the casing cooperating with the rifling in said tube for spin stabilizing the vehicle, and a casing base detachable upon launch to permit discharge of the fluid.

4. A gun-launched vehicle comprising: a thin-walled vehicle casing with a cylindrical body and a converging nose portion; a payload in the nose portion; a plastic sheath around said casing, said sheath containing a rheological medium selected from the group consisting of a fluid, a gel, a plastic, an elastomer, and a foam material filled with a fluid; a rocket motor within said casing, the voids in said motor and payload being filled with a fluid; said medium and fluid serving to minimize load differentials across the casing walls during launch of the vehicle; and a casing base detachable upon launch to permit discharge of the fluid.

5. A gun-launched vehicle comprising: a thin-walled vehicle casing with a cylindrical body and a converging nose portion; a payload in the nose portion; a sheath around said casing body; a fluid contained within said sheath; a rocket motor within said casing, the cavities of said motor being filled with a fluid, said fluids serving to minimize load differentials across the casing walls during launch of the vehicle, and a casing base detachable upon launch to permit discharge of the fluid.

6. A gun-launched vehicle comprising: a thin-walled vehicle casing with a cylindrical body and a converging nose portion; a payload in the nose portion; a sheath around said casing body, said sheath containing a medium which acts like a fluid under high acceleration; a rocket motor within said casing, the cavities of said motor being filled with a flowable material selected from the group consisting of a fluid and a gel; said medium and material serving to minimize load differentials across the casing walls during launch of the vehicle, and a casing base detachable upon launch to permit discharge of the fluid.

7. A gun-launched vehicle comprising: a thin-walled vehicle casing with a cylindrical body and a converging nose portion; a payload in the nose portion; a polyethylene sheath around said casing body; a rocket motor within said casing, the cavities of said motor being filled with a fluid; said sheath and fluid serving to minimize load differentials across the casing walls during launch of the vehicle; and a casing base detachable upon launch to permit discharge of the fluid.

8. A gun-launched projectile comprising: a thin-walled casing with a cylindrical body and a converging nose portion; a plastic sheath around said casing; a fluid contained in the cavity between the sheath and the casing; bomblets contained within said casing; a fluid filling the voids between the bomblets; said fluids serving to minimize load differentials across the casing walls during launch of the projectile.

9. A gun-launched projectile comprising: a thin-walled casing with a cylindrical body and a converging nose portion; a rheological sheath around said casing; bomblets contained within said casing; and a rheological medium filling the voids between said bomblets; the sheath and rheological material serving to minimize load differentials across the casing walls during launch of the projectile.

10. A gun-launched projectile comprising: a thin-walled casing with a cylindrical body and a converging nose portion; a rheological sheath around said casing; a payload contained within said casing; and a rheological medium filling the voids in the payload; the sheath and rheological material serving to minimize load differentials across the casing walls during launch of the projectile.

11. A gun-launched vehicle comprising: a thin-walled casing with a cylindrical body and a converging nose portion; a sheath around said casing; a fluid contained within the sheath; a payload contained within said casing; a fluid filling the voids in the payload; said fluids serving to minimize load differentials across the casing walls during launch of the vehicle.

12. A gun-launched vehicle comprising: a thin-walled vehicle casing with a cylindrical body and a converging nose portion; a sheath around said casing body, said sheath containing a medium which acts like a fluid in transmitting pressure under high acceleration; a payload contained within said casing; a fluid filling the voids in said payload; said medium and fluid serving to minimize load differentials across the casing walls during launch of the vehicle.

13. A gun-launched vehicle comprising: a thin-walled vehicle casing with a cylindrical body and a converging nose portion; a rheological sheath around said casing; a payload contained within said casing; and a rheological material filling the voids in said payload; said sheath and material serving to minimize load differentials across the casing walls during launch of the vehicle.

14. A gun-launched vehicle comprising: a thin-walled vehicle casing with a cylindrical body and a converging nose portion; a plastic sheath around said casing, said sheath containing a rheological medium selected from the group consisting of a fluid, a gel, a plastic, an elastomer, and a foam material filled with a fluid, a payload contained within said casing, the voids in said payload being filled with a fluid, said medium and fluid serving to minimize load differentials across the casing walls during launch of the vehicle.

References Cited
UNITED STATES PATENTS

| | | | |
|---|---|---|---|
| 373,459 | 11/1887 | Howell | 102—58 |
| 767,920 | 8/1904 | Ball | 102—58 |
| 2,821,137 | 1/1958 | Lyon | 102—49 X |
| 2,986,001 | 5/1961 | Green | 60—35.6 |
| 3,084,600 | 4/1963 | Walker | 89—1.7 |
| 3,104,523 | 9/1963 | O'Donnell | 60—35.6 |
| 3,121,993 | 2/1964 | Pennington | 60—35.6 |
| 3,160,062 | 12/1964 | Moy et al. | 89—1.7 |
| 3,170,288 | 2/1965 | Penza et al. | 60—35.6 |

BENJAMIN A. BORCHELT, *Primary Examiner.*

V. R. PENDEGRASS, *Assistant Examiner.*